(12) United States Patent
Liu et al.

(10) Patent No.: US 8,253,827 B2
(45) Date of Patent: Aug. 28, 2012

(54) SIGNAL CHAIN OF AN IMAGING SYSTEM

(75) Inventors: Chih-Min Liu, Tainan (TW); Amit Mittra, Irvine, CA (US); Chi-Shao Lin, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 554 days.

(21) Appl. No.: 12/555,654

(22) Filed: Sep. 8, 2009

(65) Prior Publication Data

US 2011/0058073 A1    Mar. 10, 2011

(51) Int. Cl.
*H04N 9/64* (2006.01)
*H04N 5/235* (2006.01)
*H04N 5/228* (2006.01)

(52) U.S. Cl. .................. 348/243; 348/221.1; 348/222.1

(58) Field of Classification Search ............... 348/222.1, 348/294, 257, 300, 241, 243, 221.1, 248
See application file for complete search history.

(56) References Cited

U.S. PATENT DOCUMENTS

| | | | | |
|---|---|---|---|---|
| 5,111,311 A * | 5/1992 | Yamamoto | ..................... | 358/461 |
| 6,441,684 B1 * | 8/2002 | Nakamura | ......................... | 330/9 |
| 6,587,144 B1 * | 7/2003 | Kim | ............................ | 348/241 |
| 6,694,063 B2 * | 2/2004 | Kulhalli et al. | ............... | 382/275 |
| 6,774,942 B1 * | 8/2004 | Salcedo et al. | ................. | 348/243 |
| 6,791,607 B1 * | 9/2004 | Bilhan et al. | .................... | 348/243 |
| 6,940,548 B2 * | 9/2005 | Ying et al. | ...................... | 348/241 |
| 7,515,310 B2 * | 4/2009 | Llewellyn et al. | ............. | 358/446 |
| 7,522,193 B2 * | 4/2009 | Itani et al. | .................. | 348/229.1 |
| 7,551,212 B2 * | 6/2009 | Ise | ................. | 348/243 |
| 7,616,293 B2 * | 11/2009 | Sirota et al. | ..................... | 356/28 |
| 7,791,607 B1 * | 9/2010 | Hughes et al. | ................. | 345/473 |
| 8,085,331 B2 * | 12/2011 | Kato et al. | ..................... | 348/312 |
| 8,115,835 B2 * | 2/2012 | Noguchi et al. | ............. | 348/243 |
| 2006/0061668 A1 * | 3/2006 | Ise | ............................. | 348/222.1 |
| 2006/0132625 A1 * | 6/2006 | Mori | .............................. | 348/241 |
| 2007/0216778 A1 * | 9/2007 | Hatani et al. | ................ | 348/222.1 |
| 2008/0055472 A1 * | 3/2008 | Nakakuki | ..................... | 348/572 |
| 2008/0218615 A1 * | 9/2008 | Huang et al. | .................. | 348/294 |

* cited by examiner

*Primary Examiner* — Nhan T Tran
*Assistant Examiner* — Tuan Le
(74) *Attorney, Agent, or Firm* — Stout, Uxa, Buyan & Mullins, LLP

(57) ABSTRACT

A signal chain of an imaging system is disclosed. The system includes three circuit stages. The first circuit stage includes a programmable gain amplifier (PGA) and a black level compensation (BLC) circuit that form a BLC loop. The second circuit stage includes an analog-to-digital converter (ADC), where a dark signal offset is added at an input of the ADC. The third circuit stage includes a digital gain circuit and a digital loop that makes a final output of the imaging system settle on a target level in the BLC mode.

20 Claims, 8 Drawing Sheets

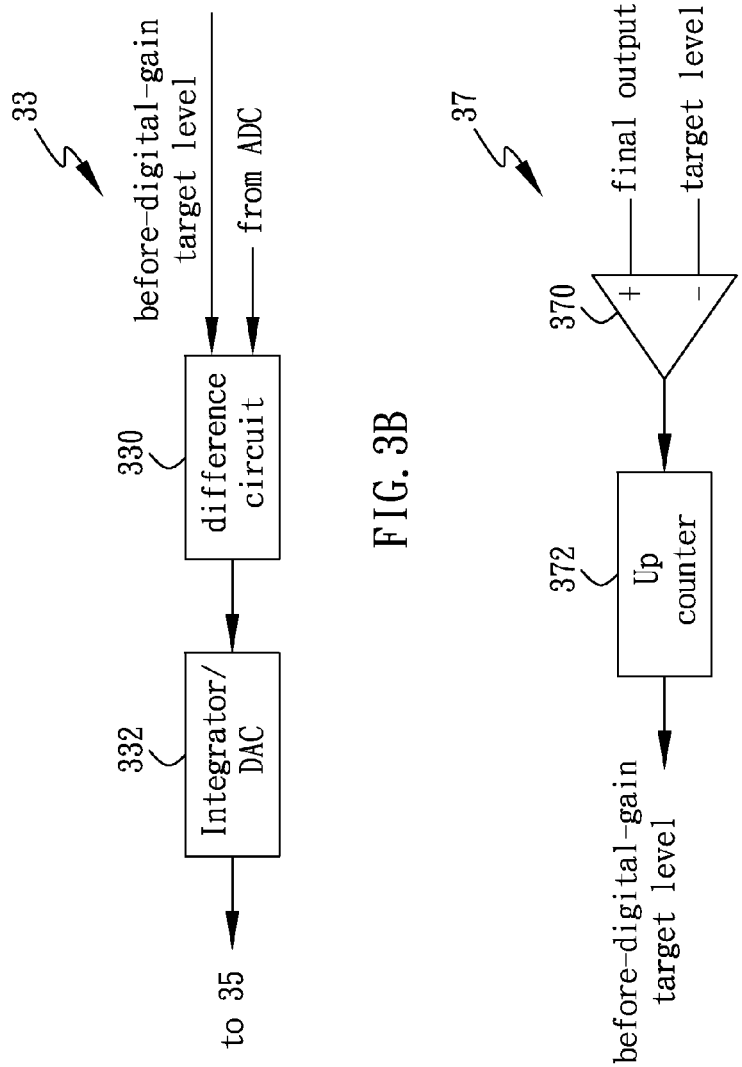

SIGNAL CHAIN OF AN IMAGING SYSTEM

CROSS-REFERENCE TO RELATED APPLICATIONS

This application is related to co-pending U.S. application Ser. No. 12/477,899, filed Jun. 3, 2009 and entitled Black Level Compensation Circuit, which is commonly assigned and the contents of which are hereby incorporated by reference.

BACKGROUND OF THE INVENTION

1. Field of the Invention

The present invention generally relates to signal chains for image sensors, and more particularly to a mixed-signal operation for a black level compensation (BLC) and high-gain signal chain.

2. Description of Related Art

Semiconductor based image sensors such as charge-coupled devices (CCDs) or complementary metal-oxide-semiconductor (CMOS) image sensors are widely used, for example, in cameras and camcorders, to convert images of visible light into electronic signals.

Due to imperfections in electronic circuitry, leakage current exists even when no light is received by the image sensor. In order to overcome this problem, black level signals are read from rows of light-shielded or optically black pixels and then averaged as an optical black reference to facilitate black level compensation (BLC).

FIG. 1 shows a signal chain 1 coupled to receive and amplify a signal, e.g., a black level signal, output from an image sensor (not shown) using an arrangement such as disclosed in the above noted U.S. application Ser. No. 12/477,899. According to the arrangement, in which like elements are identified with like reference numbers, a readout amplifier, e.g., a programmable gain amplifier (PGA) 12, receives the signal and provides an output, which is clamped to the reference voltage at which a black level, e.g., zero level, of the image sensor is defined. A black level compensation (BLC) circuit 10 is used in BLC mode to compensate the PGA 12, such that the formed loop (loop-1) accumulates offset value to fit the zero level of a compensation amplifier, e.g., an analog-to-digital converter (ADC) 14. A digital gain circuit 16 with variable digital gain is also included in the signal chain 1.

According to the signal chain 1 shown in FIG. 1, the final output out of the digital gain circuit 16 approaches zero level in the BLC mode. This zero-level black, however, is not optimally realistic and naturalistic to (e.g., as perceived by) the human eye. Further, the zero level may (e.g., is likely to) become saturated when dark noise is gathered. Moreover, real-world ADCs 14 can have unwanted ADC circuit offsets due to circuitry imperfections and process variations. These problems can become worse or even uncontrollable in the context of a high-gain signal chain 1 with a high-gain PGA 12 and/or digital gain circuit 16.

For the foregoing reasons, a need has arisen to propose a novel signal chain for image sensors in order to obtain a black output that is realistic or naturalistic to the human eye. Further, the novel signal chain should be capable of canceling unwanted ADC circuit offset, particularly in the context of high-gain signal chains.

SUMMARY OF THE INVENTION

In view of the foregoing, it is an object of the embodiments of the present invention to provide a signal chain that is substantially independent of gain settings such that a non-zero optical black reference at the final output is realistic or naturalistic to a perception of the human eye, whereby unwanted ADC circuit offset may also be satisfactorily cancelled.

According to the embodiments, the signal chain for an image sensor includes three circuit stages. The first circuit stage includes a programmable gain amplifier (PGA) and a black level compensation (BLC) circuit that form a BLC loop. The second circuit stage includes an analog-to-digital converter (ADC), wherein a dark signal offset is added at an input of the ADC. The third circuit stage includes a digital gain circuit and a digital loop that causes a final output of the signal chain to settle on a target level in the BLC mode.

According to one embodiment, the digital loop in the third circuit stage generates a before-digital-gain target level according to the target level and an output of the digital gain circuit, wherein the before-digital-gain target level has a value approximately (e.g., about) equal to the target level divided by the digital gain.

According to another embodiment, an analog offset circuit is included in the second circuit stage for generating the dark signal offset according to the before-digital-gain target level and an output of the ADC, such that the output of the ADC settles approximately (e.g., about) on the before-digital-gain target level.

According to still another embodiment, a digital offset circuit is included in the third circuit stage for receiving the final output and the target level in order to generate an output, which is further added with an output of the digital gain circuit to result in the final output setting or settling on the target level.

According to a further embodiment, an analog offset circuit is included in the second circuit stage for generating the dark signal offset according to a digital dark mean and an output of the ADC, such that the output of the ADC settles approximately (e.g., about) on the digital dark mean.

In accordance with one aspect of the embodiments, a hot pixel threshold control subsystem is further included for blocking a hot pixel signal based on a hot-pixel threshold determined according to the output of the ADC.

BRIEF DESCRIPTION OF THE DRAWINGS

FIG. 3B shows a detailed block diagram of the analog offset circuit of FIG. 3A;

FIG. 3C shows a detailed block diagram of a comparator/divider of FIG. 3A;

DETAILED DESCRIPTION OF THE INVENTION

Figure 1:
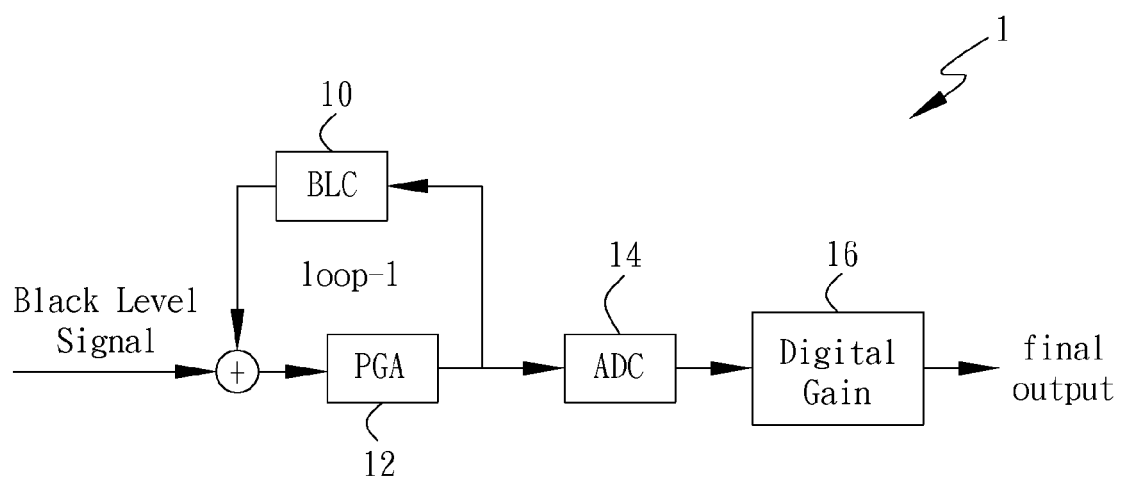
FIG. 1 shows a signal chain for an image sensor.
Figure 2:
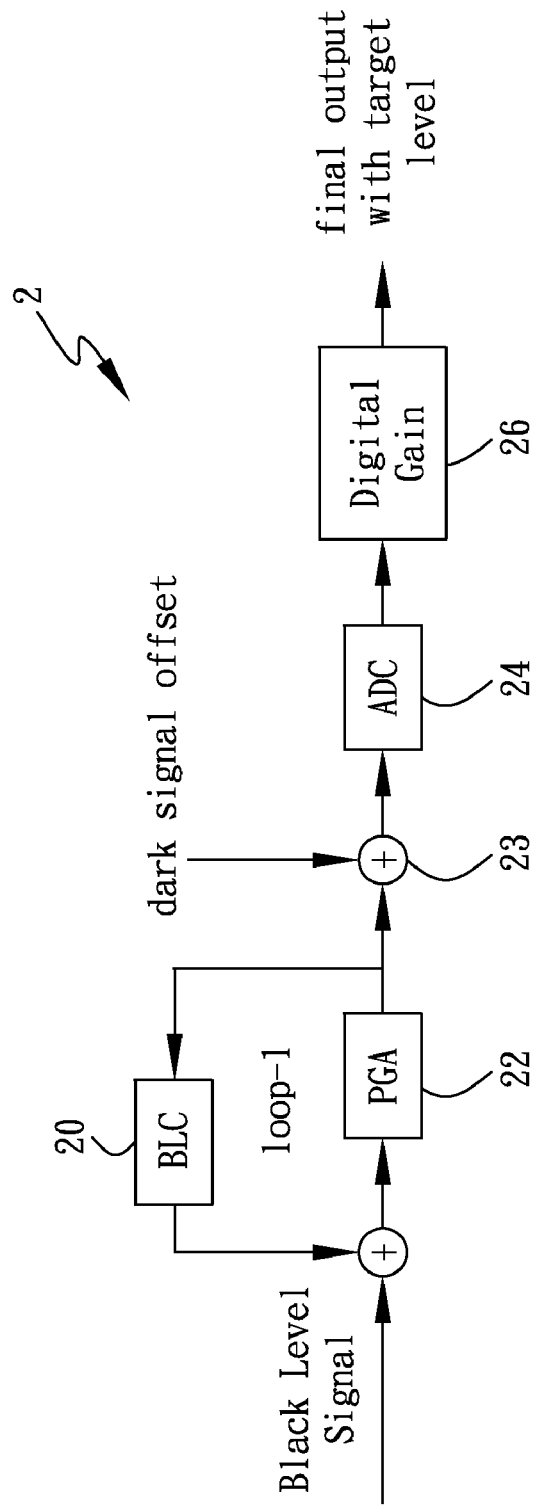
FIG. 2 shows a signal chain of an imaging system.

FIG. 2 shows a signal chain of an imaging system 2, which includes a BLC circuit 20, a PGA 22, an ADC 24, and a (variable) digital gain circuit 26. In the imaging system 2, the BLC circuit 20 and the PGA 22 forms a loop (loop-1) that receives a black level signal (from light-shielded or optically black pixels) and sets its output at, but not necessarily, zero level. In order to make the optical black reference at the final output of the imaging system 2 realistic or naturalistic to human eyes' perception, additional (required) dark signal offset is added before the ADC, for example, via an adder 23, in order to arrive at a (fixed) final output with non-zero target level in the BLC mode, substantially independent of the gain settings of the PGA 22 and the digital gain circuit 26. In addition, the (unwanted) ADC circuit offset may be also cancelled at the same time. The target level has a non-zero value. For example, in a ten-bit system which spans from 0 to 1023, the target level may be set at 20.

Figure 3A:
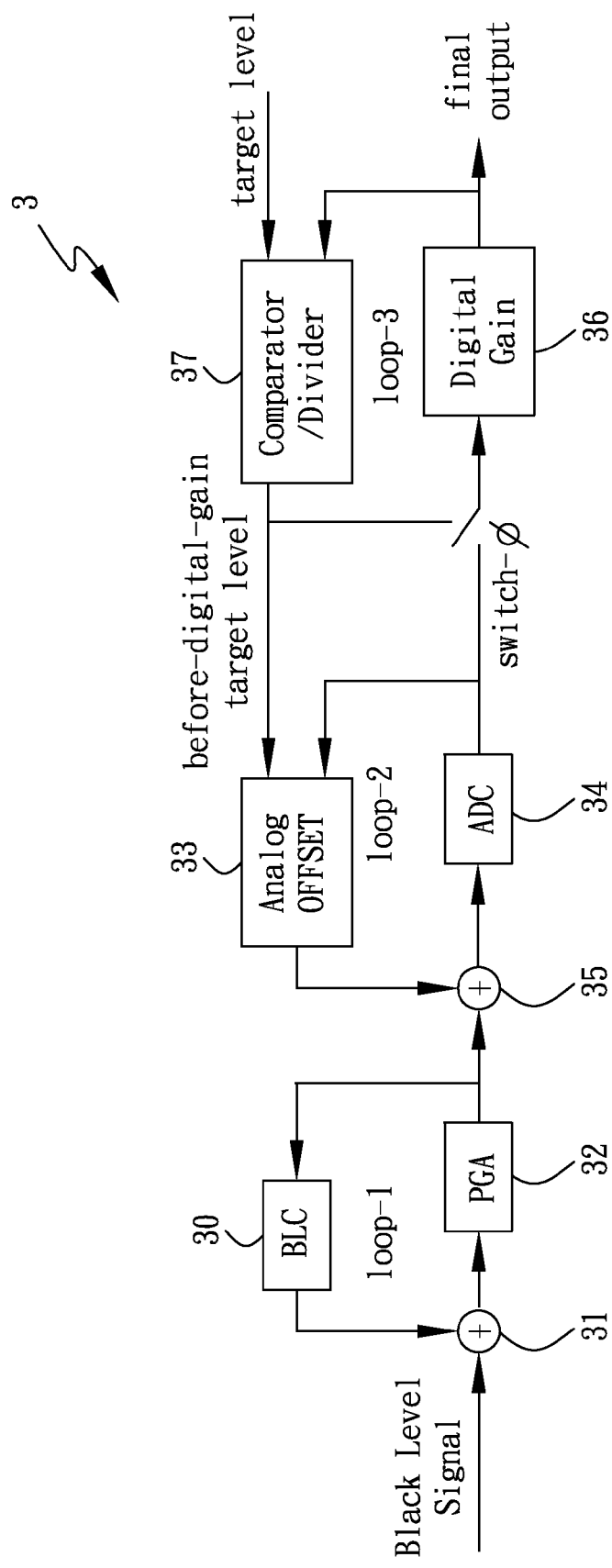
FIG. 3A shows a signal chain of an imaging system according to a first embodiment of the present invention.

FIG. 3A shows a signal chain of an imaging system 3 according to a first embodiment of the present invention. The imaging system 3 includes three circuit stages that are electrically connected directly or indirectly in turn. The first circuit stage includes a first loop (loop-1), e.g., an analog BLC loop in this embodiment, that is formed by feeding back the output of a PGA 32 to a BLC circuit 30, followed by forwarding both the output of the BLC circuit 30 and black level signal (from light-shielded or optically black pixels), via an adder 31, to the input of the PGA 32. The first circuit stage (or the first loop) may be implemented according, but not limited, to that disclosed in the U.S. application Ser. No. 12/477,899 entitled "Black Level Compensation Circuit" assigned to the same assignee of the present application.

The second circuit stage includes a second loop (loop-2) that is formed of an ADC 34 and an analog offset circuit 33. Specifically, the analog offset circuit 33 receives the output of the ADC 34 and a before-digital-gain target level (from the third circuit stage). Based on these two inputs, the analog offset circuit 33 accordingly determines an input to the ADC 34 such that the (unwanted) ADC circuit offset may be cancelled (or compensated) and, more particularly, the (required) dark signal offset may be determined in order to arrive at a final output with the (non-zero) target level. FIG. 3B exemplifies a detailed block diagram of the analog offset circuit 33 according to the present embodiment. Specifically, the analog offset circuit 33 uses a difference circuit 330 that determines the difference between the two inputs (i.e., the output of the ADC 34 and the before-digital-gain target level), and then accordingly drives, for example, an integrator 332 or a digital-to-analog converter (DAC) to generate the input to the ADC 34. (That is, the integrator 332 or DAC is driven according to the difference for generating the dark signal offset to be added to the input of the ADC 34.) The generated input is fed to the ADC 34, along with the output of the first circuit stage, via an adder 35.

The third circuit stage includes a third loop (loop-3) that is formed of a digital gain circuit 36 and a comparator/divider 37, with the switch-0 connected to close the third loop (loop-3) as shown in the BLC mode. Specifically, the comparator/divider 37 receives the target level (of the final output) and the output of the digital gain circuit 36. Based on these two inputs, the comparator/divider 37 accordingly determines an output of the ADC 34 (of the second circuit stage) by generating the before-digital-gain target level. FIG. 3C exemplifies a detailed block diagram of the comparator/divider 37 according to the present embodiment. Specifically, the comparator/divider 37 uses a comparator 370 to compare the final output and the target level. When the final output is greater than the target level, the comparing result stops the up counting of an up counter 372, thereby generating the before-digital-gain target level. In other words, the before-digital-gain target level has a value approximately equal to the target level divided by a digital gain of the digital gain circuit. It is worthy of noting that an up counter 372 is used in lieu of a digital divider that usually occupies large chip area. However, the digital divider is not excluded in implementing the comparator/divider 37.

According to the architecture of the imaging system 3, after the required analog gain in the PGA 32 and the digital gain in the digital gain circuit 36 are set and the (averaged) black level signal is received, the first loop (loop-1) and the third loop (loop-3) operate separately and, preferably but not necessarily, simultaneously to determine the input and output of the second loop (loop-2) respectively. According to one aspect, the ADC 34 has an output approximately (e.g., about) equal to the before-digital-gain target level, which is equivalent to the output of the analog offset circuit 33. Based on the determining results, the second loop (loop-2) then accumulates the required offset to fit the target level. As a result, the (non-zero) optical black reference at the final output is realistic or naturalistic to human eyes' perception, and the (unwanted) ADC circuit offset may be also cancelled at the same time.

Figure 4:
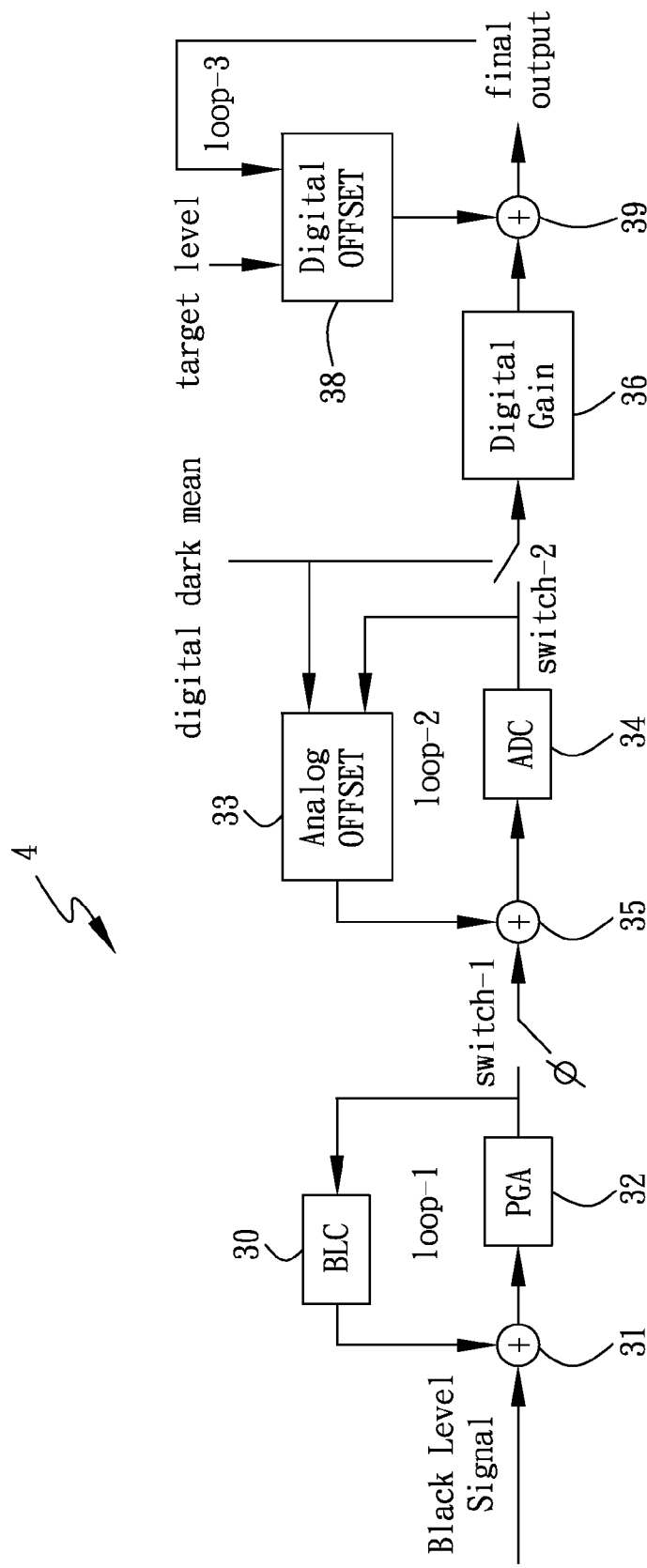
FIG. 4 shows a signal chain of an imaging system according to a second embodiment of the present invention.

FIG. 4 shows a signal chain of an imaging system 4 according to a second embodiment of the present invention. The architecture is similar to that of the first embodiment (FIG. 3A) with some distinction that will be described below. The reference numerals used in the previous embodiment are used here to denote the same blocks. Regarding the second circuit stage, the analog offset circuit 33, in the embodiment, receives a digital dark mean instead of the before-digital-gain target reference as in the previous embodiment. The digital dark mean may be an expectant output of the ADC 34, and may be obtained based on experimentation or be set by a user.

Regarding the third circuit stage, the third loop (loop-3) does not encompass the digital gain circuit 36 as in the previous embodiment. Instead, the third loop (loop-3) is formed by connecting the final output and the target level to inputs of a digital offset circuit 38, output of which is fed to an adder 39 connected at the output of the digital gain circuit 36. The digital offset circuit 38 may be implemented in a manner similar to the analog offset circuit 33 exemplified in FIG. 3B.

According to the architecture depicted in FIG. 4, all of the three loops may operate simultaneously in the BLC mode, in which the switch-1 is connected to zero level and the switch-2 is connected to the digital dark mean as shown. In other words, the second loop (loop-2) need not wait for the before-digital-gain target level provided by the third loop as in the previous embodiment (FIG. 3A). After the calibration, the first circuit stage (or the first loop) has an output of approximately (e.g., about) zero level. The second circuit stage (or the second loop) has an output approximately (e.g., about) equal to the digital dark mean, which is equivalent to the output of the analog offset circuit 33. In other words, the output of the ADC settles approximately (e.g., about) on the digital dark mean. The third circuit stage (or the third loop) has an output of the target level value of which is approximately (e.g., about) equal to (digital dark mean)x(digital gain)+(output of the digital offset circuit 38). Thus, the final output settles approximately (e.g., about) on the target level. Compared to the previous embodiment (FIG. 3A), the BLC operation in the present embodiment is faster for the reason that the three loops can be operated simultaneously. Further, the BLC operation in the present embodiment may eliminate quantization error for the reason that the digital offset circuit 38 can precisely fit the target level.

Figure 5:
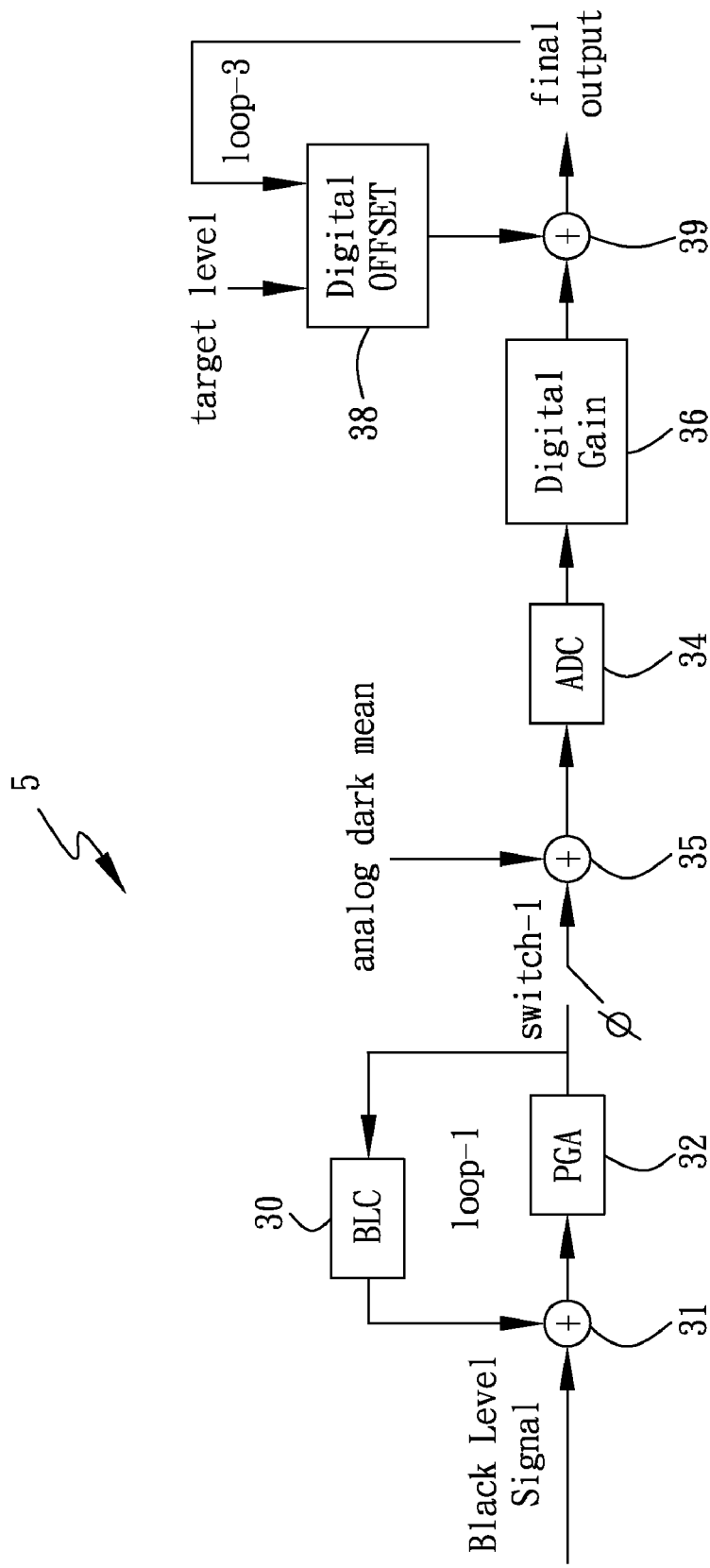
FIG. 5 shows a signal chain of an imaging system according to a third embodiment of the present invention.

FIG. 5 shows a signal chain of an imaging system 5 according to a third embodiment of the present invention. The architecture is similar to that of the second embodiment (FIG. 4) with some distinction, particularly the second circuit stage, that will be described below. The reference numerals used in the previous embodiment are used here to denote the same blocks.

Regarding the second circuit stage, instead of providing the digital dark mean as in the previous embodiment, an analog dark mean may be directly fed to the adder 35 before the ADC 34, thereby substantially simplifying the architecture of the second circuit stage. The analog dark mean is an expectant output of the ADC 34, and may be approximately (e.g., about) equivalent to the digital dark mean in value. Similar to the digital dark mean, the analog dark mean in the present invention may be obtained based on experimentation or be set by a user. The BLC operation of the present (third) embodiment is similar to that of the previous (second) embodiment, that is, the three loops may operate simultaneously in the BLC mode. The simplified architecture in the present embodiment may be preferably adopted over other embodiments provided that the ADC circuit offset is small and assured in a range.

Figure 6:
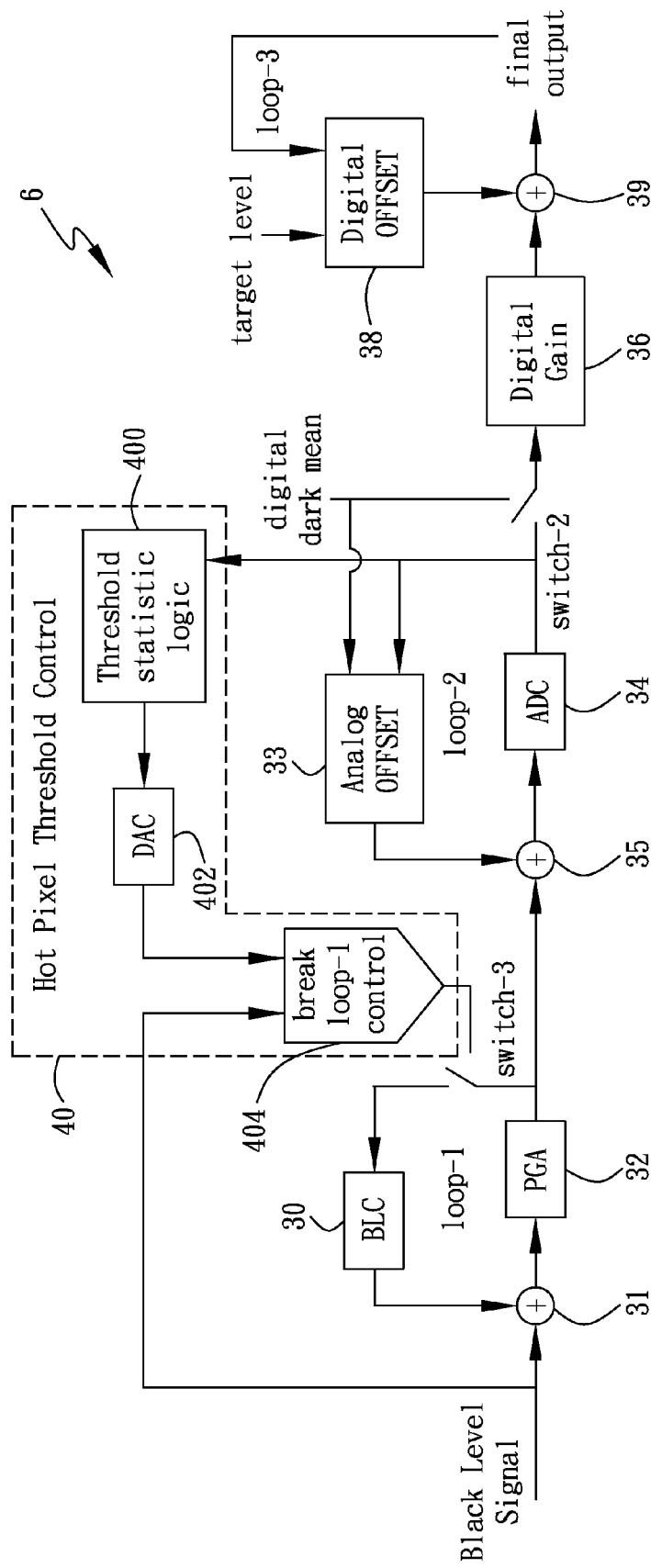
FIG. 6 shows a signal chain of an imaging system according to a fourth embodiment of the present invention.

FIG. 6 shows a signal chain of an imaging system 6 according to a fourth embodiment of the present invention. The architecture is based on the signal chain of FIG. 4 with additional hot pixel threshold control subsystem 40, which is used to handle hot pixel effect due to manufacture non-ideality. The reference numerals used in the previous embodiment are used here to denote the same blocks.

After the three loops settle, individual dark pixel signals, including hot pixel(s), are inputted to the imaging system 6. The threshold statistic logic 400 determines (in the digital domain) a proper (digital) hot-pixel threshold according to the outputs of the ADC 34. The determined hot-pixel threshold is converted into analog form, by a DAC 402. The (analog) hot-pixel threshold and the dark pixel signal are then fed to a break loop-1 control circuit 404. When the level of the input dark pixel signal exceeds the hot-pixel threshold (e.g., when the black level signal is determined as the hot pixel signal), the break loop-1 control circuit 404 controls the switch-3 to open (or break) the first loop (loop-1), thereby blocking the hot pixel from going into the BLC circuit 30.

Figure 7:
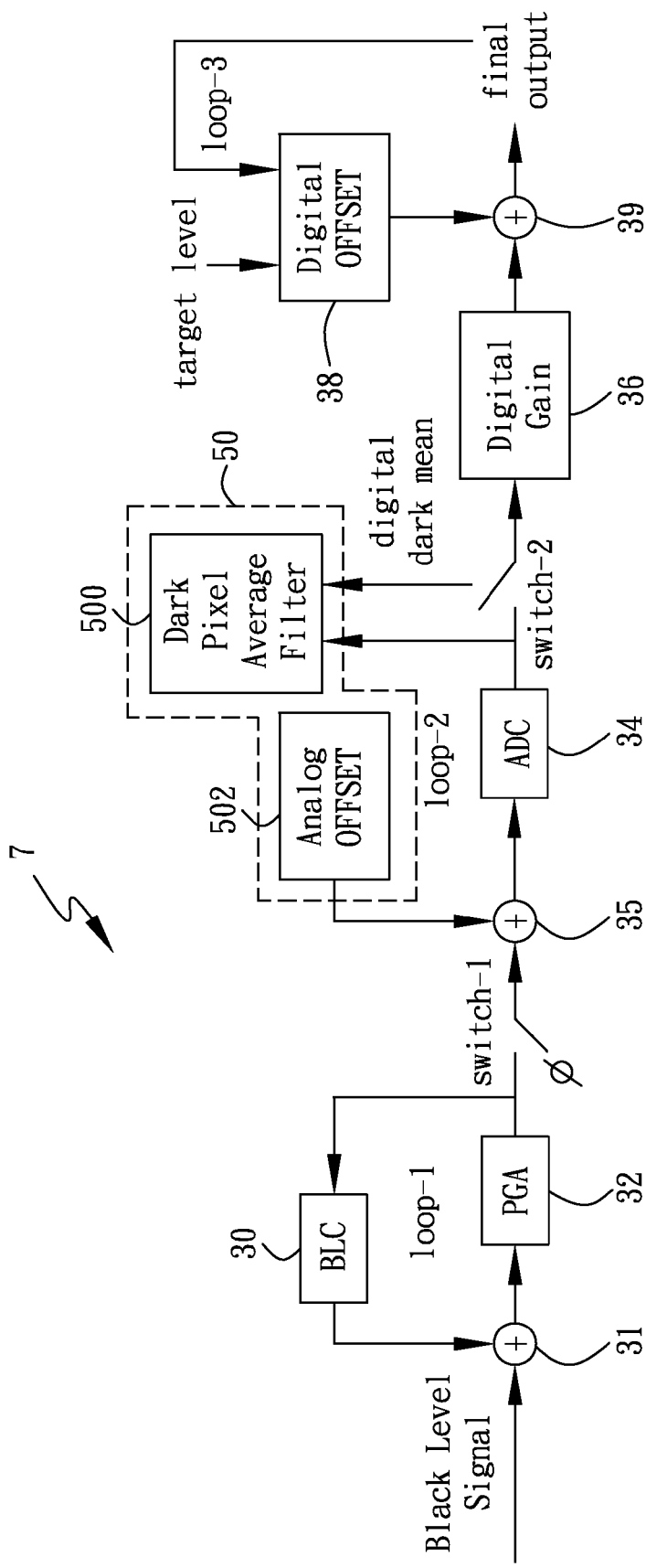
FIG. 7 shows a signal chain of an imaging system according to a fifth embodiment of the present invention.

FIG. 7 shows a signal chain of an imaging system 7 according to a fifth embodiment of the present invention. The architecture is similar to that of the fourth embodiment (FIG. 6) with some distinction that will be described below. The reference numerals used in the previous embodiment are used here to denote the same blocks.

In the present embodiment, the hot pixel threshold control subsystem 50 includes a dark pixel average filter 500 that averages, in the digital domain, all dark pixel signals except hot pixel signals based on a statistic hot-pixel threshold. The hot-pixel threshold is determined according to the outputs of the ADC 34.

The hot pixel threshold control subsystem 50 also includes an analog offset circuit 502, which is similar to that in FIG. 4, for providing an input to the ADC 34 according to the digital dark mean and the output of the ADC 34. Compared to FIG. 6, the hot pixel threshold control subsystem 50 in the present embodiment operates in digital domain. Moreover, the hot pixel control in the present embodiment involves no gain setting of the PGA 32.

Although specific embodiments have been illustrated and described, it will be appreciated by those skilled in the art that various modifications may be made without departing from the scope of the present invention, which is intended to be limited solely by the appended claims.

What is claimed is:

1. An imaging system, comprising:
a first circuit stage including a programmable gain amplifier (PGA) and a black level compensation (BLC) circuit that form a BLC loop, wherein the PGA receives a black level signal and the BLC circuit compensates the PGA;
a second circuit stage including an analog-to-digital converter (ADC), wherein a dark signal offset is added at an input of the ADC; and
a third circuit stage including a digital gain circuit and a digital loop that causes a final output of the imaging system to settle on a target level; and
wherein the digital loop in the third circuit stage generates a before-digital-gain target level according to the target level and an output of the digital gain circuit, and wherein the before-digital-gain target level has a value about equal to the target level divided by a digital gain of the digital gain circuit.

2. The system of claim 1, wherein the BLC circuit in the first circuit stage receives an output of the PGA, and an output of the BLC circuit and the black level signal are added to an input of the PGA.

3. The system of claim 1, wherein: the second circuit stage is coupled to succeed the first circuit stage; the third circuit stage is coupled to succeed the second circuit stage; and the output of the PGA arrives about at zero level in a BLC mode.

4. The system of claim 1, further comprising an analog offset circuit in the second circuit stage, wherein the analog offset circuit generates the dark signal offset according to the before-digital-gain target level and an output of the ADC, such that the output of the ADC settles approximately on the before-digital-gain target level.

5. An imaging system, comprising:
a first circuit stage including a programmable gain amplifier (PGA) and a black level compensation (BLC) circuit that form a BLC loop, wherein the PGA receives a black level signal and the BLC circuit compensates the PGA;
a second circuit stage including an analog-to-digital converter (ADC), wherein a dark signal offset is added at an input of the ADC; and
a third circuit stage including a digital gain circuit and a digital loop that causes a final output of the imaging system to settle on a target level; and
a digital offset circuit in the third circuit stage, wherein the digital offset circuit receives the final output and the target level in order to generate an output, which is further added with an output of the digital gain circuit to result in the final output settling on the target level.

6. The system of claim 5, further comprising an analog offset circuit in the second circuit stage, wherein the analog offset circuit generates the dark signal offset according to a digital dark mean and an output of the ADC, such that the output of the ADC settles approximately on the digital dark mean.

7. The system of claim 6, further comprising a hot pixel threshold control subsystem for blocking a hot pixel signal based on a hot-pixel threshold determined according to the output of the ADC.

8. The system of claim 5, wherein the BLC circuit in the first circuit stage receives an output of the PGA, and an output of the BLC circuit and the black level signal are added to an input of the PGA.

9. The system of claim 5, wherein: the second circuit stage is coupled to succeed the first circuit stage; the third circuit stage is coupled to succeed the second circuit stage; and the output of the PGA arrives about at zero level in a BLC mode.

10. An imaging system, comprising:
a first circuit stage including a programmable gain amplifier (PGA) and a black level compensation (BLC) circuit that form a first loop, wherein the PGA receives a black level signal and the BLC circuit compensates the PGA;

a second circuit stage, including an analog-to-digital converter (ADC) and an analog offset circuit that form a second loop, which generates a dark signal offset to be added at an input of the ADC; and a third circuit stage, including a digital gain circuit and a comparator/divider that form a third loop for making final output of the imaging system settle on a target level, wherein the comparator/divider generates a before-digital-gain target level according to the target level and an output of the digital gain circuit, wherein the before-digital-gain target level has a value approximately equal to the target level divided by a digital gain of the digital gain circuit;

wherein the analog offset circuit generates the dark signal offset according to the before-digital-gain target level and the output of the ADC, such that the output of the ADC settles about on the before-digital-gain target level.

11. The system of claim 10, wherein:

the second circuit stage succeeds the first circuit stage;

the third circuit stage succeeds the second circuit stage; and the BLC circuit in the first circuit stage receives an output of the PGA, and an output of the BLC circuit and the black level signal are added to an input of the PGA.

12. The system of claim 10, wherein the analog offset circuit comprises:

a difference circuit for determining difference between the output of the ADC and the before-digital-gain target level; and an integrator or DAC driven according to the difference for generating the dark signal offset to be added to the input of the ADC.

13. The system of claim 10, wherein the comparator/divider comprises:

a comparator for comparing the final output and the target level; and an up counter for generating the before-digital-gain target level, wherein a comparing result of the comparator stops up counting of the up counter whenever the final output is greater than the target level.

14. An imaging system, comprising:

a first circuit stage including a programmable gain amplifier (PGA) and a black level compensation (BLC) circuit that form a first loop, wherein the PGA receives a black level signal and the BLC circuit compensates the PGA;

a second circuit stage, succeeding the first circuit stage, including an analog-to-digital converter (ADC) and an analog offset circuit that form a second loop, which generates a dark signal offset to be added at an input of the ADC, wherein the analog offset circuit generates the dark signal offset according to a digital dark mean and an output of the ADC, such that the output of the ADC settles about on the digital dark mean; and a third circuit stage, succeeding the second circuit stage, including a digital gain circuit and a digital offset circuit, wherein the digital offset circuit receives a final output and a target level in order to generate an output to be added with an output of the digital gain circuit to result in the final output settling on the target level.

15. The system of claim 14, wherein the BLC circuit in the first circuit stage receives an output of the PGA, and an output of the BLC circuit and the black level signal are added to an input of the PGA.

16. The system of claim 14, wherein the analog offset circuit comprises:

a difference circuit for determining difference between the output of the ADC and the digital dark mean; and an integrator or DAC driven according to the difference for generating the dark signal offset to be added to the input of the ADC.

17. The system of claim 14, further comprising a hot pixel threshold control subsystem for blocking a hot pixel signal based on a hot-pixel threshold determined according to the output of the ADC.

18. The system of claim 17, wherein the hot pixel threshold control subsystem comprises:

threshold statistic logic for determining a hot-pixel threshold according to the output of the ADC;

a digital-to-analog converter (DAC) for converting the hot-pixel threshold from a digital form into an analog form; and a break control circuit for controllably breaking the first loop whenever the black level signal is determined as the hot pixel signal.

19. The system of claim 17, wherein the hot pixel threshold control subsystem comprises:

a dark pixel average filter for averaging, in digital domain, all the dark pixel signals except the hot pixel signal based on a statistic hot-pixel threshold that is determined according to the output of the ADC.

20. An imaging system, comprising: a first circuit stage including a programmable gain amplifier (PGA) and a black level compensation (BLC) circuit that form a BLC loop, wherein the PGA receives a black level signal and the BLC circuit compensates the PGA; a second circuit stage, succeeding the first circuit stage, including an analog-to-digital converter (ADC), wherein an analog dark mean is added to an input of ADC; and a third circuit stage, succeeding the second circuit stage, including a digital gain circuit and a digital offset circuit, wherein the digital offset circuit receives a final output and a target level in order to generate an output to be added with an output of the digital gain circuit to result in the final output setting on the target level;

wherein the BLC circuit in the first circuit stage receives an output of the PGA, and an output of the BLC circuit and the black level signal are added to an input of the PGA.

* * * * *